US008854587B2

(12) United States Patent  (10) Patent No.: US 8,854,587 B2
Chung et al.  (45) Date of Patent: Oct. 7, 2014

(54) LIQUID CRYSTAL DISPLAY DEVICE

(75) Inventors: Te-Chen Chung, Kunshan (CN); Yongqian Li, Kunshan (CN); Chia-Te Liao, Kunshan (CN)

(73) Assignee: Infovision Optoelectronics (Kunshan) Co., Ltd., Kunshan (CN)

( * ) Notice: Subject to any disclaimer, the term of this patent is extended or adjusted under 35 U.S.C. 154(b) by 255 days.

(21) Appl. No.: 13/495,006

(22) Filed: Jun. 13, 2012

(65) Prior Publication Data

US 2013/0033666 A1    Feb. 7, 2013

(30) Foreign Application Priority Data

Aug. 1, 2011  (CN) .......................... 2011 1 0225983
Nov. 30, 2011  (CN) .......................... 2011 1 0389095

(51) Int. Cl.
*G02F 1/1343*  (2006.01)
*G02F 1/1337*  (2006.01)

(52) U.S. Cl.
CPC .... *G02F 1/133707* (2013.01); *G02F 1/134363* (2013.01)
USPC ....................................................... 349/141

(58) Field of Classification Search
USPC ....................................................... 349/141
See application file for complete search history.

(56) References Cited

U.S. PATENT DOCUMENTS

| 2004/0174481 | A1* | 9/2004 | Lin et al. ........................ 349/129 |
| 2005/0117102 | A1* | 6/2005 | Park et al. ...................... 349/141 |
| 2005/0206824 | A1* | 9/2005 | Son et al. ....................... 349/141 |
| 2005/0280763 | A1* | 12/2005 | Kang et al. ..................... 349/141 |

* cited by examiner

*Primary Examiner* — Timothy L Rude
(74) *Attorney, Agent, or Firm* — Aaron Wininger; Perkins Coie LLP

(57) ABSTRACT

A liquid crystal display device, in which each pixel region includes a plurality of first electrodes electrically connected to each other, a plurality of second electrodes electrically connected to each other and a plurality of third electrodes electrically connected to each other; the third electrodes are arranged in parallel with the second electrodes approximately and are electrically connected with the first electrodes; the first electrodes and the second electrodes are located in different layers respectively and there is an insulation layer therebetween; the first electrodes and the third electrodes intersect with each other to define a plurality of unit regions; there are two second electrodes passing through inside each unit region, and the first electrode between the two second electrodes is provided with a protrusion-shaped pattern in a position not overlapping with the second electrode. The LCD device has a wider viewing angle and lower operating voltage.

23 Claims, 12 Drawing Sheets

LIQUID CRYSTAL DISPLAY DEVICE

CROSS-REFERENCE TO RELATED APPLICATIONS

This application claims priority of and incorporates by reference Chinese Patent Applications No. 201110225983.5 filed Aug. 1, 2011 and No. 201110389095.7 filed Nov. 30, 2011.

FIELD OF THE INVENTION

The present invention relates to field of liquid crystal display, and more particularly but not necessarily exclusively, to a Liquid Crystal Display (LCD) device.

BACKGROUND

A Thin Film Transistor-Liquid Crystal Display (TFT-LCD) device is widely applied to the panel display field because of low radiation, thin thickness and low power consumption. Most table TFT-LCD devices adopt a Twisted Nematic (TN) mode. First electrodes and second electrodes of a TN LCD device are formed on an upper substrate and a lower substrate respectively, and liquid crystal molecules of the TN type LCD device rotate in a flat surface which is orthogonal with the substrates. Because of the optical anisotropy of liquid crystal molecules, optical paths of light entering human eyes after passing through liquid crystal molecules from different angles are different, and thus display effects are different, which will inevitably result in a viewing angle problem.

SUMMARY

An embodiment of the invention provides an LCD device, which has a wider viewing angle and lower operating voltage.

An embodiment of the present invention provides an LCD device, which includes a first substrate and a second substrate which are disposed oppositely, and a liquid crystal layer between the first substrate and the second substrate, wherein the first substrate comprises a transparent substrate, and a plurality of scanning lines and a plurality of data lines which are formed on the transparent substrate, the plurality of scanning lines and the plurality of data lines crosswise define a plurality of pixel regions; each pixel region comprises a plurality of first electrodes which are electrically connected to each other, a plurality of second electrodes which are electrically connected to each other, and a plurality of third electrodes which are electrically connected to each other; the third electrodes are arranged in parallel with the second electrodes approximately and are electrically connected with the first electrodes; the plurality of first electrodes and the plurality of second electrodes are located in different layers respectively and there is an insulation layer between the plurality of first electrodes and the plurality of second electrodes; the plurality of first electrodes and the plurality of third electrodes intersect with each other to define a plurality of unit regions; there are two second electrodes passing through inside each unit region, and the first electrode between the two second electrodes inside the unit region is provided with a protrusion-shaped pattern in a position not overlapping with the second electrode.

Through intersecting the electrodes and configuring protrusion-shaped patterns on the LCD device provided by the embodiment of the present invention, when the LCD device works and voltage difference is applied between the first electrodes and the second electrodes, both a fringe electric field and a horizontal electric field are formed in one unit region, the liquid crystal molecules in the liquid crystal layer can be affected by both the fringe electric field and the horizontal electric field, and rotate under the action of fringe field effect and horizontal field effect. Under the action of both the fringe electric field and the horizontal electric field, the liquid crystal molecules may faster rotate, so as to reduce response time of the liquid crystal molecules. And further, the drive voltage of the liquid crystal molecules may be decreased, so as to improve transmittance.

The LCD device provided by the embodiment of the present invention is different from the conventional FFS and IPS display modes. In comparison to the conventional FFS and IPS display modes, the LCD device has advantages of the FFS and IPS type LCD devices.

Additional aspects and features of the embodiments of the present invention will be obvious from the detailed description, taken in conjunction with the accompanying drawings. It should be noted that the accompanying drawings are only used to illustrate the present invention, but are not used to limit the protection scope of the present invention, and the protection scope of the present invention should be defined by the claims. It should also be noted that, except as indicated, it is unnecessary to draw the accompanying drawings based on proportion because the accompanying drawings only try to schematically illustrate the structure and flowchart described herein.

DETAILED DESCRIPTION OF EMBODIMENTS

Figure 1:
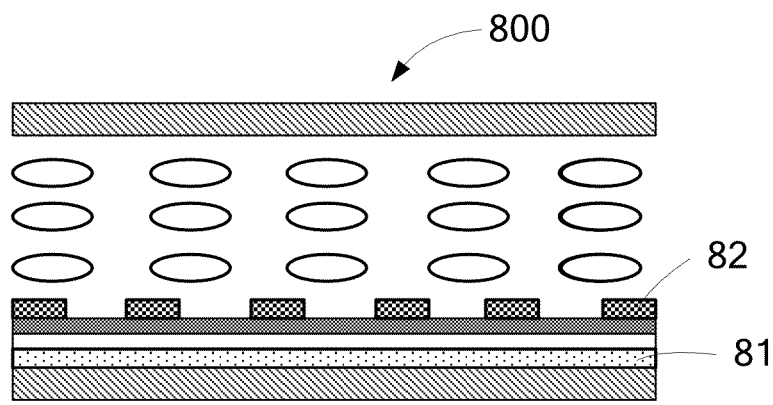
FIG. 1 is a cross-section view of a conventional FFS type LCD device.
Figure 2:
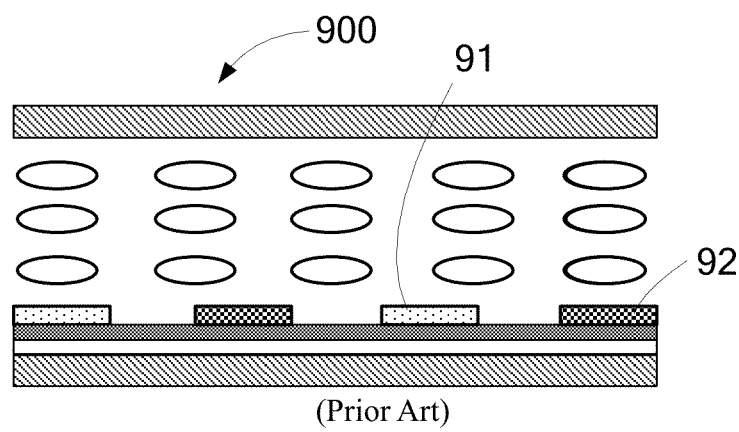
FIG. 2 is a cross-section view of a conventional IPS type LCD device.

In order to solve the viewing angle problem, the TN type LCD device is generally overlaid with a viewing angle compensating film because the requirements for viewing angle are not high in a personal or official environment. Because some products such as televisions and hand Personal Digital Assistant (PDAs) requires a wider viewing angle, several new liquid crystal display modes, e.g., a Fringe Field Switching (FFS) mode, an In-Plane Switch (IPS) mode and so on, are applied to these products. FIG. 1 illustrates a cross-section view of a conventional FFS type LCD device. As shown in FIG. 1, first electrodes 81 and second electrodes 82 of the FFS type LCD device 800 are both formed on a lower substrate, and the first electrodes 81 and the second electrodes 82 are located in different layers respectively. In a pixel region, the first electrodes 81 are configured as a whole sheet, and the second electrodes 82 are configured as strips. FIG. 2 illustrates a cross-section view of a conventional IPS type LCD device. As shown in FIG. 2, first electrodes 91 and second electrodes 92 of the IPS type LCD device 900 are both formed on a lower substrate, and the first electrodes 91 and the second electrodes 92 are located in the same layer. In a pixel region, both the first electrodes 91 and the second electrodes 92 are configured as strips and are arranged alternately. Since the first electrodes 81 and the second electrodes 82 of the FFS type LCD device 800 are both formed on the same substrate and the first electrodes 91 and the second electrodes 92 of the IPS type LCD device 900 are both formed on the same substrate, liquid crystal molecules rotate in a flat surface parallel with the substrate, and thus viewing angle characteristics are improved, so as to implement wide-angle display.

The mode of overlaying a viewing angle compensating film on the TN type LCD device is widely applied because of low technology requirements. However, since the compensating film is fixed, the compensating film can not compensate all gray scales and angles. And thus, the gray scale inversion phenomenon of the TN type LCD device still exists. Since the technology requirements for the FFS type LCD device and the IPS type LCD device are high, production costs are high.

Therefore, it is necessary to provide an improved technical solution to solve the above problem.

In order to make the features and advantages of embodiments of the present invention clearer, the embodiments of the present invention will be illustrated in detail hereinafter with reference to the accompanying drawings.

It should be noted that, in order to make the accompanying drawings clear, the accompanying drawings of embodiments of the present invention omit certain structural features.

The LCD device according to an embodiment includes a first substrate 100, 200, 300 and a second substrate (not shown) which are disposed oppositely, and a liquid crystal layer (not shown) between the first substrate 100, 200, 300 and the second substrate. The first substrate 100, 200, 300 of the present invention may be formed through multiple modes. In this way, multiple kinds of LCD devices may be implemented by using multiple kinds of first substrates 100, 200, 300. Hereinafter, the LCD device, especially the component and pixel structure of the first substrate therein, and beneficial technical effects brought will be illustrated in detail.

First Embodiment

Figure 3:
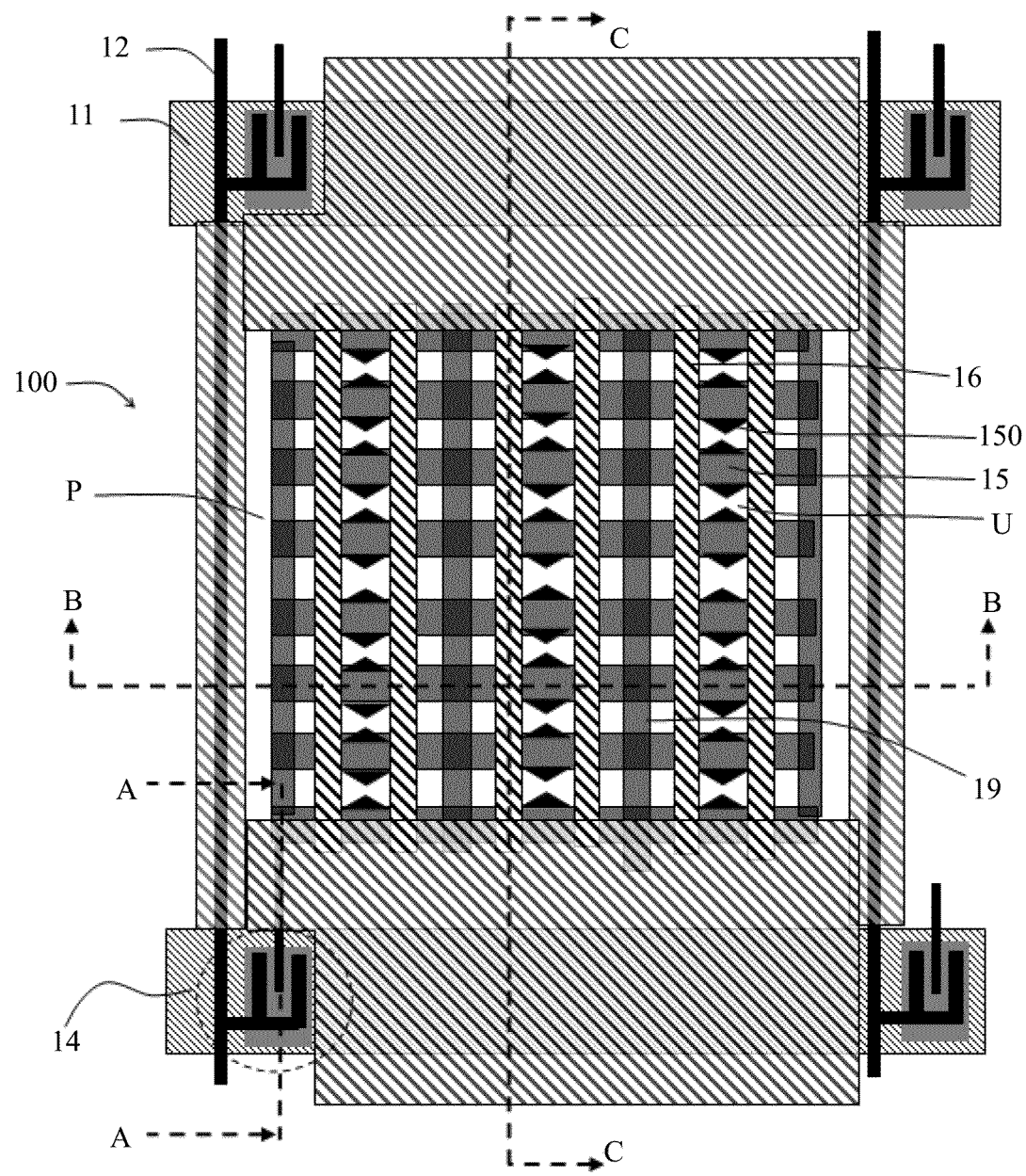
FIG. 3 is a plan view of a first substrate in an LCD device according to a first embodiment of the present invention.
Figure 4:
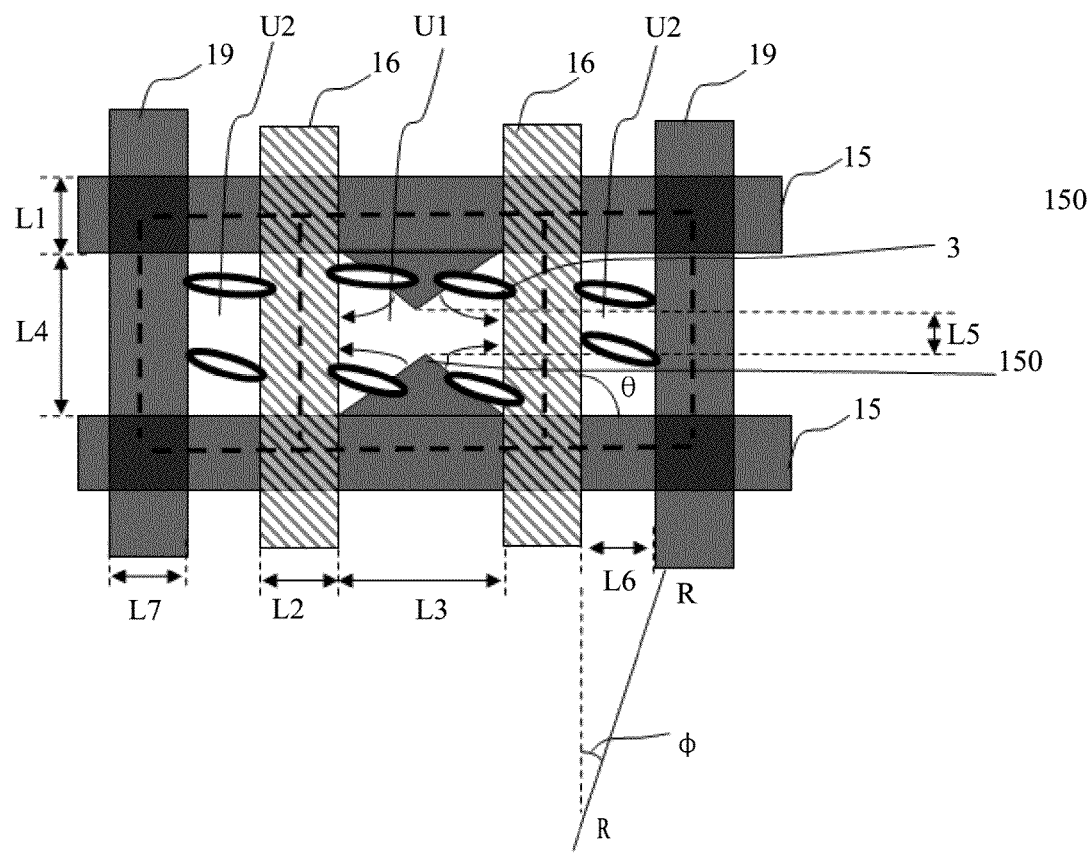
FIG. 4 is an enlarged view of a part of a unit region in FIG. 3.

FIGS. 3-4 and 5a-5c shows a structure diagram of a first substrate in an LCD device provided by a first embodiment of the present invention. In order to make the drawings simple and clear, FIG. 3 only shows a plan view of one pixel region P on the first substrate 100. As shown in FIGS. 3-4 in view of FIGS. 5a-5c, the first substrate 100 in the LCD device provided by the first embodiment of the present invention includes a transparent substrate 10, a plurality of scanning lines 11, a common electrode bus (not shown) and a plurality of data lines 12 which are all formed on the transparent substrate 10, and TFTs 14 formed at the intersection location of the scanning lines 11 and the data lines 12. Each TFT 14 includes a gate electrode 141 which is electrically connected with the scanning line 11, a semiconductor layer 142, a source electrode 143 which is electrically connected with the data line 12, and a drain electrode 144 which is electrically connected with a pixel electrode. The plurality of scanning lines 11 and a plurality of data lines 12 intersect with each other to define a plurality of pixel regions P, i.e., two adjacent scanning lines 11 and two adjacent data lines 12 intersect with each other to define one pixel region P.

Each pixel region P includes a plurality of first electrodes 15 which are electrically connected to each other, a plurality of second electrodes 16 which are electrically connected to each other and a plurality of third electrodes 19 which are electrically connected to each other. The third electrodes 19 are arranged in parallel with the second electrodes 16 approximately and are electrically connected with the first electrodes 15. In an embodiment of the present invention, the plurality of first electrodes 15 are electrically connected to each other via the plurality of third electrodes 19, and the plurality of third electrodes 19 are arranged in parallel with the second electrodes 16 approximately. In the embodiment of the present invention, the first electrodes 15, the second electrodes 16 and the third electrodes 19 are all transparent electrodes, which may be formed with transparent conductive materials such as Indium Tin Oxide (ITO). The plurality of first electrodes 15 and the plurality of second electrodes 16 are located in different layers respectively and there is an insulation layer between the first electrodes 15 and the second electrodes 16. The plurality of third electrodes 19 and the plurality of first electrodes 15 may be formed with the transparent conductive materials on the same layer, i.e., the first electrodes 15 and the third electrodes 19 may be formed in the same process. The plurality of first electrodes 15 and the plurality of third electrodes 19 intersect with each other to define a plurality of unit regions U. In an embodiment, each pixel region P includes at least four unit regions U, so as to improve transmittance. The number of unit regions U shown in FIG. 3 is only used to easily describe the embodiment, and is not used to limit the present invention, and the number of unit regions U may be determined according to the size of the LCD device and actual process conditions.

As shown in FIGS. 3 and 4, there are two second electrodes 16 passing through inside each unit region U, and the first electrode 15 between the two second electrodes 16 inside the unit region U is provided with a protrusion-shaped pattern 150 in a position not overlapping with the second electrode 16. In an embodiment, the protrusion-shaped pattern 150 is configured in the middle of the first electrode 15 between the two second electrodes 16 passing through the interior of the unit region U, so as to ensure the symmetry of an electric field generated in the unit region U when the LCD device works. In an embodiment, all protrusion-shaped patterns have the same structure, so as to ensure the uniformity of an electric field generated in the whole pixel region P when the LCD device works.

As shown in FIG. 3, in the embodiment of the present invention, the plurality of first electrodes 15, the plurality of second electrodes 16 and the plurality of third electrodes 19 each have strip structures, and the plurality of first electrodes 15 are arranged in parallel approximately, the plurality of second electrodes 16 are arranged in parallel approximately, and the plurality of third electrodes 19 are arranged in parallel approximately.

As shown in FIGS. 3 and 4, an angle θ between the first electrodes 15 and the second electrodes 16 is in the range of about 50 to about 150 degrees, so as to make liquid crystal molecules 3 have a faster response speed. In the first embodiment of the present invention, the first electrodes 15 are perpendicular to the second electrodes 16. Specifically, the plurality of first electrodes 15 are arranged in parallel with the scanning lines 11 approximately, the plurality of second electrodes 16 are arranged in parallel with the data lines 12 approximately, and the plurality of third electrodes 19 are also arranged in parallel with the data lines 12 approximately, so as to make the LCD device have a more regular pixel structure. However, the arrangement of the first electrodes 15, the second electrodes 16 and third electrodes 19 is not limited to this, the first electrodes 15 may be arranged in parallel with one of the scanning line 11 and the data line 12 approximately, and the second electrodes 16 and the third electrodes 19 may be arranged in parallel with the other one of the scanning line 11 and the data line 12 approximately. In another embodiment of the present invention, for example, the plurality of first electrodes 15 may also be arranged in parallel with the data lines 12 approximately, and the plurality of second electrodes 16 and the plurality of third electrodes 19 may be arranged in parallel with the scanning lines 11 approximately.

As shown in FIG. 4, in the embodiment of the present invention, the shape of the protrusion-shaped pattern 150 is triangle, and an angle between the hypotenuse of the triangle and the first electrode 15 is in the range of about 0 to about 60 degrees, so as to make the liquid crystal molecules 3 faster rotate and increase transmittance. However, the shape of the protrusion-shaped pattern 150 is not limited to triangle, and may also be a trapezoid, rectangle, arc, etc.

Figure 5A:
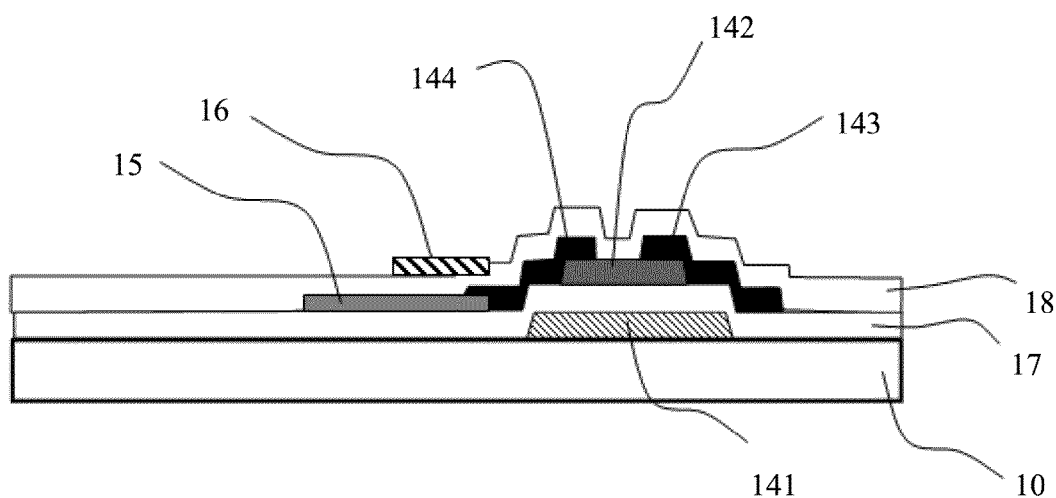
FIG. 5a is a sectional view along A-A line in FIG. 3.
Figure 5B:
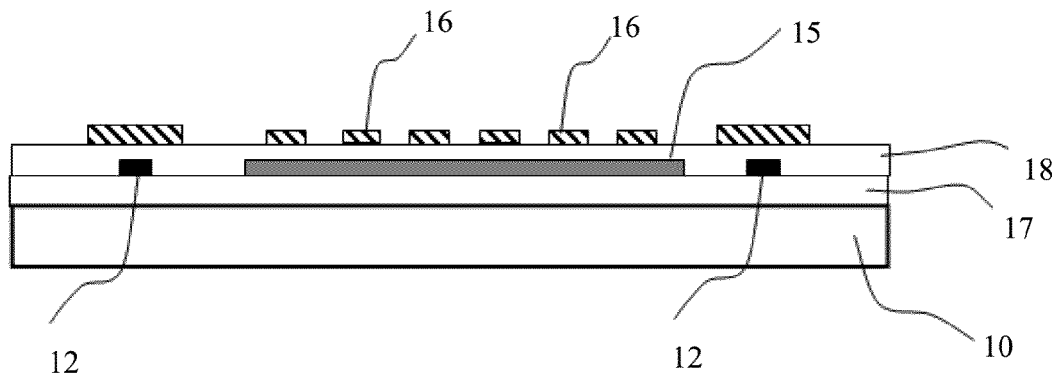
FIG. 5b is a sectional view along B-B line in FIG. 3.
Figure 5C:
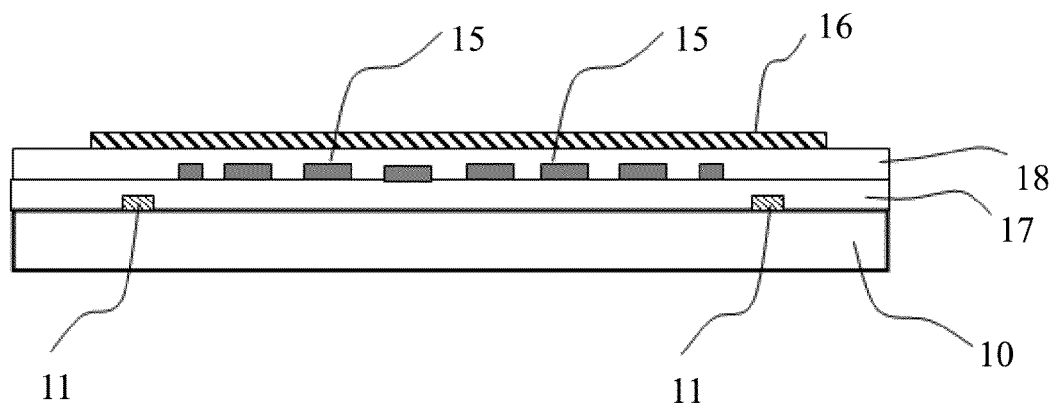
FIG. 5c is a sectional view along C-C line in FIG. 3.

As shown in FIGS. 5a-5c, on the first substrate 100 in the first embodiment of the present invention, the first electrodes 15 are pixel electrodes which are electrically connected with drain electrodes 144 of the TFTs 14, the protrusion-shaped patterns 150 are configured on the pixel electrodes, and the second electrodes 16 are common electrodes. However, the first electrodes 15 in the first embodiment of the present invention are not limited to pixel electrodes, and may be common electrodes, and the protrusion-shaped patterns 150 are configured on the common electrodes. Actually, the embodiment of the present invention can be implemented as long as one of the first electrodes 15 and the second electrodes 16 are pixel electrodes and the other one of the first electrodes 15 and the second electrodes 16 are common electrodes. On the first substrate 100 in the first embodiment of the present invention, the pixel electrodes are located in a lower layer, and the common electrodes are located in an upper layer, i.e., the common electrodes are located above the pixel electrodes, and the insulation layer between the pixel electrodes and the common electrodes is a passivation layer 18.

Accordingly, a LCD device according to an embodiment of the present invention comprise: the upper layer electrodes and the lower layer electrodes on the first substrate 100 are all configured as strips in the whole pixel region P; since the lower layer electrodes are configured as strips, a part of the lower layer electrodes in the whole pixel region P are not covered by transparent electrodes, so as to increase transmittance.

In an embodiment of the present invention, the width L1 of the first electrode 15, the width L2 of the second electrode 16 and the width L7 of the third electrode 19 are in the range of about 2 to about 5 microns. Since there is a disclination line over the first electrode 15, the second electrode 16 and the third electrode 19, the less the width L1 of the first electrode 15, the width L2 of the second electrode 16 and the width L7 of the third electrode 19 are, the better the effect is. However, limited to actual process capability and considering process yield, it may be better to configure the width L1 of the first electrode 15 and the width L2 of the second electrode 16 as about 2-about 5 microns, or, the width L2 of the second electrode 16 is about the same as the width L7 of the third electrode 19.

In an embodiment of the present invention, in the unit region U, the clearance width L3 between two second electrodes 16 passing through the unit region U is in the range of about 3 to about 8 microns, the clearance width L4 between two adjacent first electrodes 15 is in the range of about 0 to about 6 microns, the spacing L5 between protrusion-shaped patterns 150 on two adjacent first electrodes 15 is in the range of about 0 to about 6 microns, and the clearance width L6 between the second electrode 16 and the third electrode 19 adjacent with the second electrode 16 is in the range of about 2 to about 4 microns. In a unit region U, the clearance width L3 between two adjacent second electrodes 16 is configured to make the triangular protrusion-shaped pattern 150 on the first electrode 15 exposed. In an embodiment, the clearance width L3 between two adjacent second electrodes 16 is configured in the range of about 3 to about 8 microns. In a unit region U, considering the utilization of actual electric field component, the spacing L5 between protrusion-shaped patterns 150 on two adjacent first electrodes 15 is configured in the range of about 0 to about 6 microns. In a unit region U, the clearance width L6 between the second electrode 16 and the third electrode 19 adjacent with the second electrode 16 is configured in the range of about 2 to about 4 microns, so that an ideal horizontal electric field component can be formed between the second electrode 16 and the third electrode 19.

The LCD device provided by the embodiment of the present invention may further include a first alignment film (not shown) on the first substrate 100 and a second alignment film (not shown) on the second substrate. In the embodiment of the present invention, the protrusion-shaped patterns 150 are configured on the first electrodes 15, and thus, in an embodiment, the rubbing direction (e.g., R-R line as shown in FIG. 4) of the first alignment film and the second alignment film is different from the direction of the second electrodes on which no protrusion-shaped pattern 150 is configured, so as to make the liquid crystal molecules 3 have an initial rotation moment, form an angle between the direction of the liquid crystal molecules 3 and the electric field, and make the liquid crystal molecules 3 rotate uniformly along one direction under the action of initial electric field force. In an embodiment, an angle φ between the direction of the second electrode 16 and the rubbing direction (R-R line) of the first alignment film and the second alignment film is in the range of about 0 to about 30 degrees, so as to make the liquid crystal molecules 3 have a bigger moment of rotating along one direction initially, and have larger moment of force and faster response time.

In the LCD device provided by the embodiment of the present invention, the first electrodes 15, the second electrodes 16 and the third electrodes 19 are formed on the first substrate 100, the first electrodes 15 and the third electrodes 19 are formed on the same layer and electrically connected to each other, the second electrodes 16 are formed on the other layer, and an insulation layer is used to space the two layer of electrodes. The first electrodes 15 and the second electrodes 16 intersect, and the first electrodes 15 and the third electrodes 19 also intersect. In each of unit regions U which are formed by the intersection of the first electrodes 15 and the third electrodes 19, there are two second electrodes 16 passing through inside the unit region U. As shown in FIG. 4, each unit region U includes sub-unit regions U1 and U2 (regions surrounded by dashed lines in FIG. 4). The sub-unit region U1 is a region which is formed by the intersection of the first electrodes 15 and two second electrodes 16 passing through the unit region U, and the sub-unit region U2 is a region which is formed by the intersection of the first electrodes 15, the second electrodes 16 passing through the unit region U and the third electrodes 19 adjacent to the second electrodes 16. As shown in FIG. 4, each unit region U includes one sub-unit region U1 located in the middle of the unit region U and two sub-unit regions U2 located at two sides of the sub-unit region U1 respectively. In this embodiment, the first electrode 15 between two second electrodes 16 inside the unit region U is provided with a protrusion-shaped pattern 150 in a position not overlapping with the second electrodes 16. That is to say, the first electrode 15 inside the sub-unit region U1 has the protrusion-shaped pattern 150 in a position not overlapping with the second electrodes 16. By intersecting the electrodes and configuring protrusion-shaped patterns 150 on the LCD device provided by the embodiment of the present invention, when the LCD device works and voltage difference is applied between the first electrodes 15 and the second electrodes 16, as shown in FIG. 4, both a fringe electric field and a horizontal electric field may be formed in one unit region U. In the sub-unit region U1 as shown in FIG. 4, the liquid crystal molecules 3 in the liquid crystal layer of a region which is located between the second electrodes 16 passing through the interior of the unit region can be affected by both the fringe electric field and the horizontal electric field, and rotate under the action of the fringe field effect and horizontal field effect. Under the action of both the fringe electric field and the horizontal electric field, the liquid crystal molecules 3 may rotate faster, so as to reduce response time of the liquid crystal molecules 3. Further, the drive voltage of the liquid crystal molecules 3 may be decrease under the action of both the fringe electric field and the horizontal electric field, so as to improve transmittance. In the sub-unit region U2 as shown in FIG. 4, the liquid crystal molecules 3 in the liquid crystal layer of a region which is located between the adjacent second electrodes 16 and the third electrodes 19 are affected by a horizontal electric field formed between the second electrodes 16 and the third electrodes 19 which are arranged in parallel approximately, and thus may rotate faster, so as to reduce response time of the liquid crystal molecules 3, decrease the drive voltage of the liquid crystal molecules 3, and improve transmittance. Since in the sub-unit region U2, the horizontal electric field between the second electrodes 16 and the third electrodes 19 is strong, the liquid crystal molecules 3 in this region may twist faster, and can drive the liquid crystal molecules 3 in the liquid crystal layer in the sub-unit region U1 to fast twist, so as to improve the response speed of the LCD device. Accordingly, the LCD device has advantages of the FFS and IPS LCD devices.

In the LCD device provided by an embodiment of the present invention, only the overlapping section of the first electrode 15 and the second electrode 16 has a storage capacitor of pixel. And thus, compared with the conventional FFS type LCD device, the area occupied by the storage capacitor of an embodiment of the present invention is much smaller. In this way, the insulation layer between the first electrodes 15 and the second electrodes 16 in the LCD device provided by an embodiment of the present invention may be made thinner than that of the conventional FFS type LCD device, so as to reduce the use of Chemical Vapor Deposition (CVD). Accordingly, compared with the FFS type LCD device, the process of the LCD device provided by the embodiment of the present invention is faster, so as to improve capacity.

Figure 6:
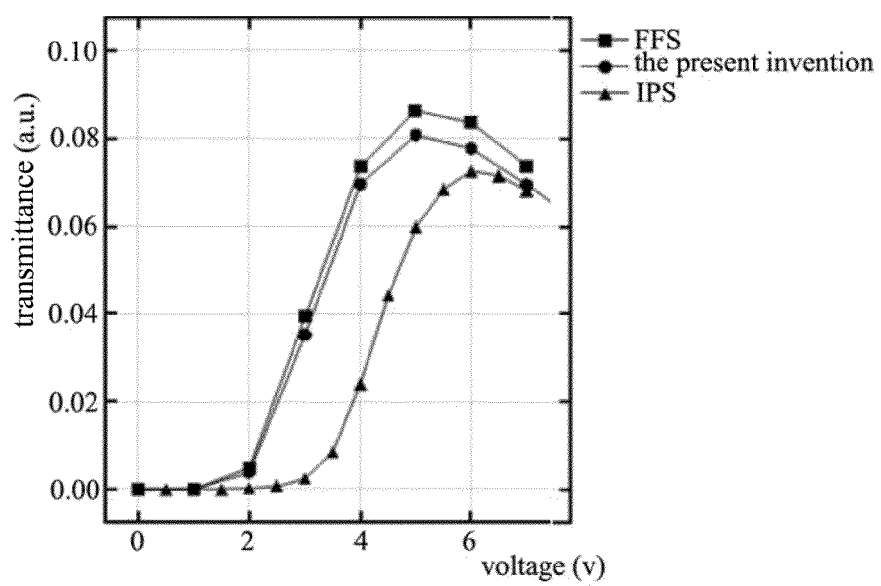
FIG. 6 is an effect contrast diagram of transmittance-voltage of conventional FFS and IPS type LCD devices and the LCD device provided by the first embodiment of the present invention.

FIG. 6 is an effect contrast diagram of transmittance-voltage of conventional FFS and IPS type LCD devices and the LCD device provided by the first embodiment of the present invention. All curves in FIG. 6 are generated in the same simulation condition. As can be seen from FIG. 6, the transmittance of the LCD device provided by the embodiment of the present invention is approximately similar to that of the conventional FFS type LCD device. It can be seen through comparing the curve of the embodiment of the present invention and the curve of the conventional IPS type LCD device that the drive voltage of the LCD device provided by the embodiment of the present invention is much lower than that of the conventional IPS type LCD device, and the transmittance of the LCD device provided by the embodiment of the present invention is much higher than that of the conventional IPS type LCD device.

Figure 7A:
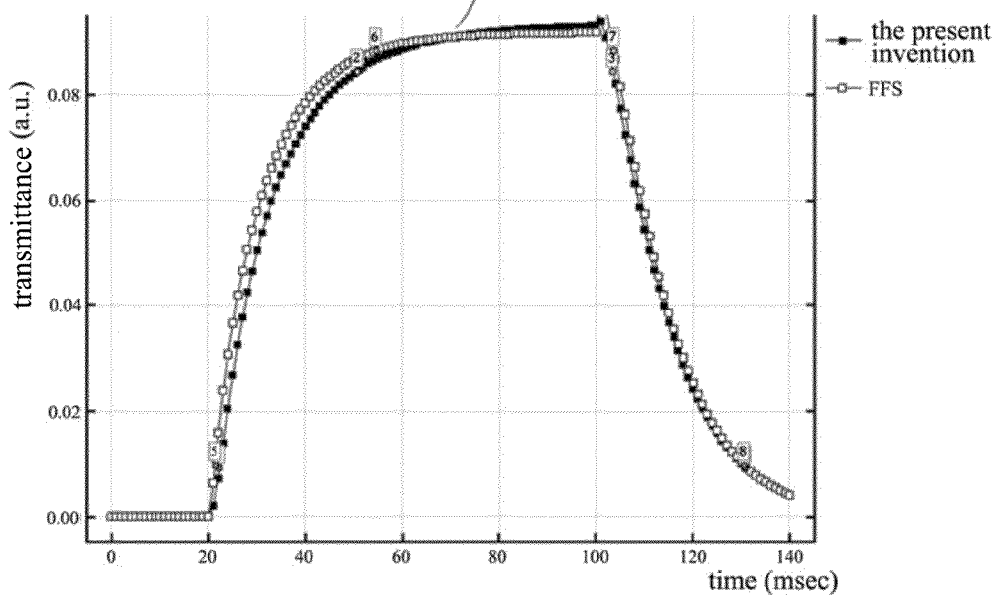
FIG. 7a is an effect contrast diagram of transmittance-response time of the conventional FFS type LCD device and the LCD device provided by the first embodiment of the present invention.

FIG. 7a is an effect contrast diagram of transmittance-response time of the conventional FFS type LCD device and the LCD device provided by the first embodiment of the present invention. All curves in FIG. 7a are generated in the same simulation condition. In the table above the curves shown in FIG. 7a, $T_{on}$ is time needed by the liquid crystal molecules 3 to rotate when transmittance is increased from 10% to 90%, and $T_{off}$ is time needed by the liquid crystal molecules 3 to rotate when transmittance is decreased from 90% to 10%. As can be seen from FIG. 7a, $T_{on}$ of the LCD device provided by the embodiment of the present invention is obviously less than that of the conventional FFS type LCD device, and $T_{off}$ of the LCD device provided by the embodiment of the present invention is similar to that of the conventional FFS type LCD device. Therefore, the response time of the LCD device provided by the embodiment of the present invention is obviously better than that of the conventional FFS type LCD device, and the transmittance of the LCD device provided by the embodiment of the present invention is approximately similar to that of the conventional FFS type LCD device.

Figure 7B:
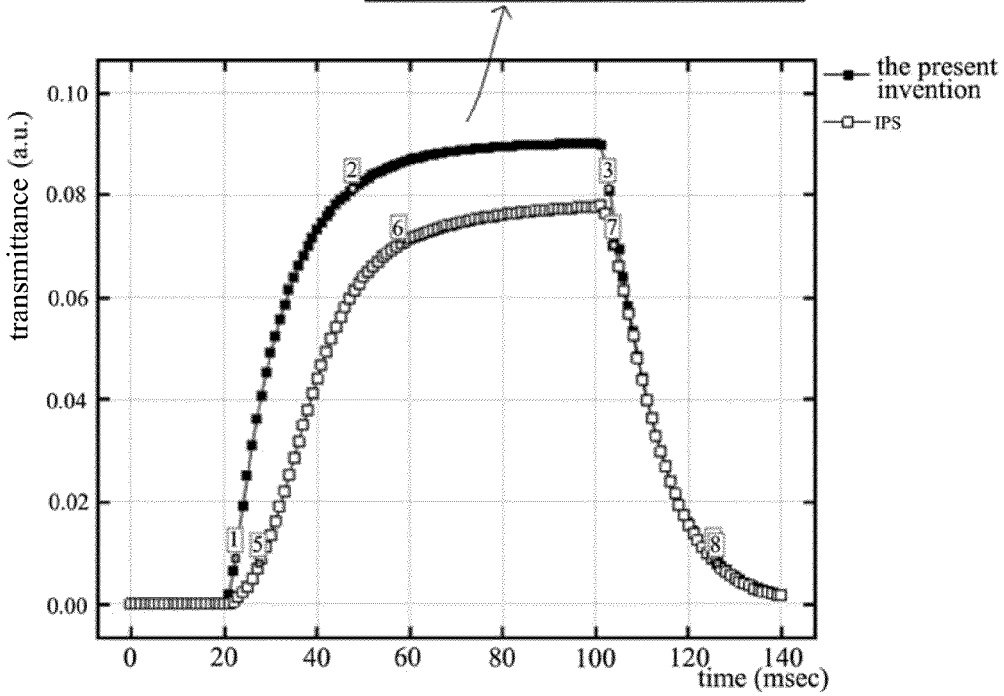
FIG. 7b is an effect contrast diagram of transmittance-response time of the conventional IPS type LCD device and the LCD device provided by the first embodiment of the present invention.

FIG. 7b is an effect contrast diagram of transmittance-response time of the conventional IPS type LCD device and the LCD device provided by the first embodiment of the present invention. All curves in FIG. 7b are generated in the same simulation condition. In the table above the curves shown in FIG. 7b, $T_{on}$ is time needed by the liquid crystal molecules 3 to rotate when transmittance is increased from 10% to 90%, and $T_{off}$ is time needed by the liquid crystal molecules 3 to rotate when transmittance is decreased from 90% to 10%. As can be seen from FIG. 7b, $T_{on}$ and $T_{off}$ of the LCD device provided by the embodiment of the present invention is obviously less than those of the conventional IPS type LCD device. Therefore, the response time of the LCD device provided by the embodiment of the present invention is obviously better than that of the conventional IPS type LCD device, and the whole transmittance of the LCD device provided by the embodiment of the present invention is larger than that of the conventional IPS type LCD device.

To sum up, the LCD device provided by the embodiment of the present invention has faster response time and higher transmittance.

Figure 8:
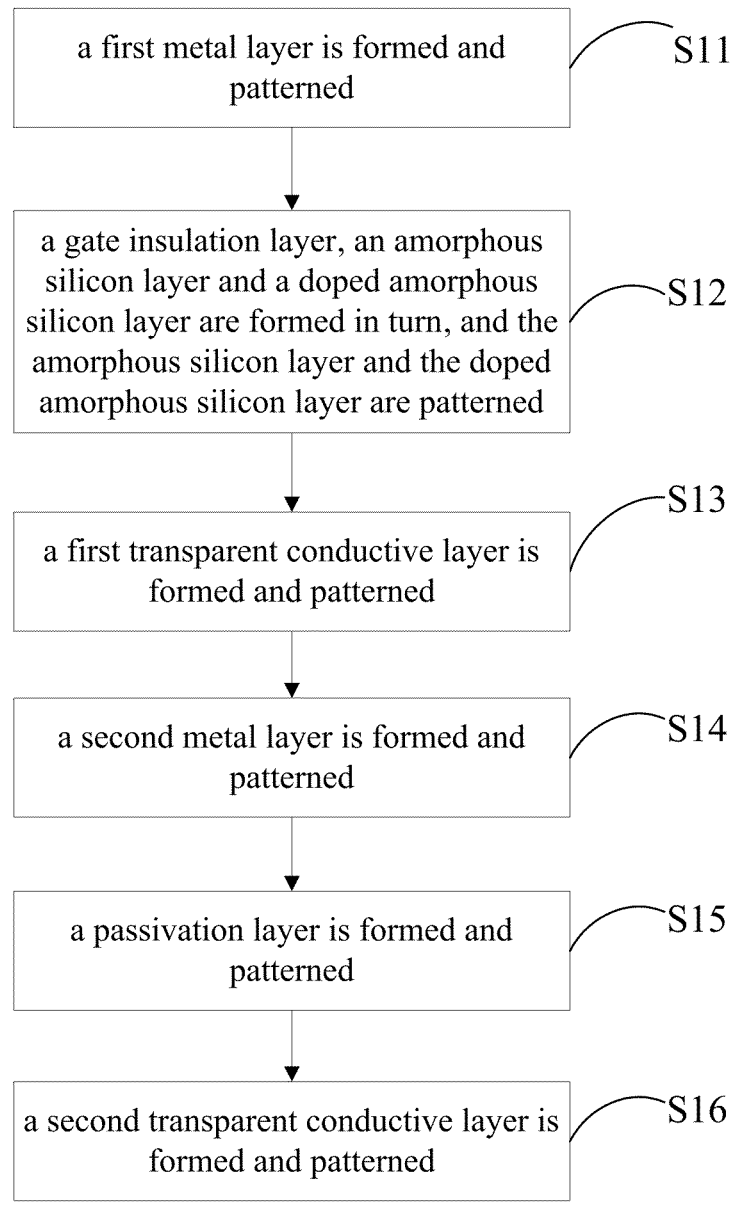
FIG. 8 is a flow diagram of manufacturing the first substrate in the LCD device of the first embodiment of the present invention shown in FIG. 3.

The first substrate 100 in the first embodiment of the present invention may be manufactured by following six mask processes. FIG. 8 illustrates a flow diagram of manufacturing the first substrate 100 in the LCD device provided by the first embodiment of the present invention. The manufacturing process of the first substrate 100 in the first embodiment of the present invention will be illustrated in detail hereinafter with reference to FIG. 8 and in view of FIGS. 3 and 5a-5c.

As shown in FIG. 8 in view of FIGS. 3 and 5a-5c, in block S11, a first metal layer is formed, and is patterned through a first mask process.

Specifically, the first metal layer and a first photoresist layer are formed in turn on the transparent substrate 10, and the first photoresist layer is exposed and developed through a first mask pattern to form a first photoresist layer pattern; by taking the first photoresist layer pattern as a mask, the first metal layer is etched to be patterned, so as to form the scanning lines 11, a common electrode bus (not shown), the gate electrode 141 of TFT 14; and then the first photoresist layer is removed.

In block S12, a gate insulation layer 17, an amorphous silicon layer and a doped amorphous silicon layer are formed in turn, and the amorphous silicon layer and the doped amorphous silicon layer are patterned through a second mask process.

Specifically, the gate insulation layer 17, the amorphous silicon layer, the doped amorphous silicon layer and a second photoresist layer are formed in turn on the transparent substrate 10 having the patterned first metal layer, and the second photoresist layer is exposed and developed through a second mask pattern to form a second photoresist layer pattern; by taking the second photoresist layer pattern as a mask, the amorphous silicon layer and the doped amorphous silicon layer are etched to be patterned, so as to form a semiconductor layer 142 of the TFT 14; and then the second photoresist layer is removed.

In block S13, a first transparent conductive layer is formed, and is patterned through a third mask process.

Specifically, the first transparent conductive layer and a third photoresist layer are formed in turn on the transparent substrate 10 on which the second mask pattern is formed, and the third photoresist layer is exposed and developed through a third mask pattern to form a third photoresist layer pattern; by taking the third photoresist layer pattern as a mask, the first transparent conductive layer is etched to be patterned, so as to form strip-like pixel electrodes (i.e., the first electrodes 15 and the third electrodes 19) which are electrically connected to each other, and form the protrusion-shaped pattern 150 on the strip-like first electrode 15 in a position where the first electrodes 15 do not overlap with the later formed common electrodes (i.e. the second electrodes 16) and is between two second electrodes which are between two third electrodes 19; and then the third photoresist layer is removed.

In block S14, a second metal layer is formed, and is patterned through a fourth mask process.

Specifically, the second metal layer and a fourth photoresist layer are formed in turn on the transparent substrate 10 on which the third mask pattern is formed, and the fourth photoresist layer is exposed and developed through a fourth mask pattern to form a fourth photoresist layer pattern; by taking the fourth photoresist layer pattern as a mask, the second metal layer is etched to be patterned, so as to form the data lines 12, and the source electrode 143 and the drain electrode 144 of the TFT 14 through the patterned second metal layer, where the pixel electrodes 15 and the drain electrode 144 of the TFT 14 are electrically contacted to each other; and then the fourth photoresist layer is removed.

In block S15, a passivation layer 18 is formed, and is patterned through a fifth mask process.

Specifically, the passivation layer 18 and a fifth photoresist layer are formed in turn on the transparent substrate 10 on which the fourth mask pattern is formed, and the fifth photoresist layer is exposed and developed through a fifth mask pattern to form a fifth photoresist layer pattern; by taking the fifth photoresist layer pattern as a mask, the passivation layer 18 and the gate insulation layer 17 below the passivation layer 18 are etched to be patterned, so as to form a through hole (not shown) which can make the later formed common electrodes 16 and the common electrode bus be electrically connected, and form other through holes (not shown) crossing a circuit part; and then the fifth photoresist layer is removed.

In block S16, a second transparent conductive layer is formed, and is patterned through a sixth mask process.

Specifically, the second transparent conductive layer and a sixth photoresist layer are formed in turn on the transparent substrate 10 on which the fifth mask pattern is formed, and the fifth photoresist layer is exposed and developed through a sixth mask pattern to form a sixth photoresist layer pattern; by taking the sixth photoresist layer pattern as a mask, the second transparent conductive layer is etched to be patterned, so as to form a plurality of strip-like common electrodes 16 which are electrically connected to each other; and then the sixth photoresist layer is removed.

After performing the above blocks S11-S16, the first substrate 100 described in the first embodiment of the present invention is formed.

Second Embodiment

Figure 9:
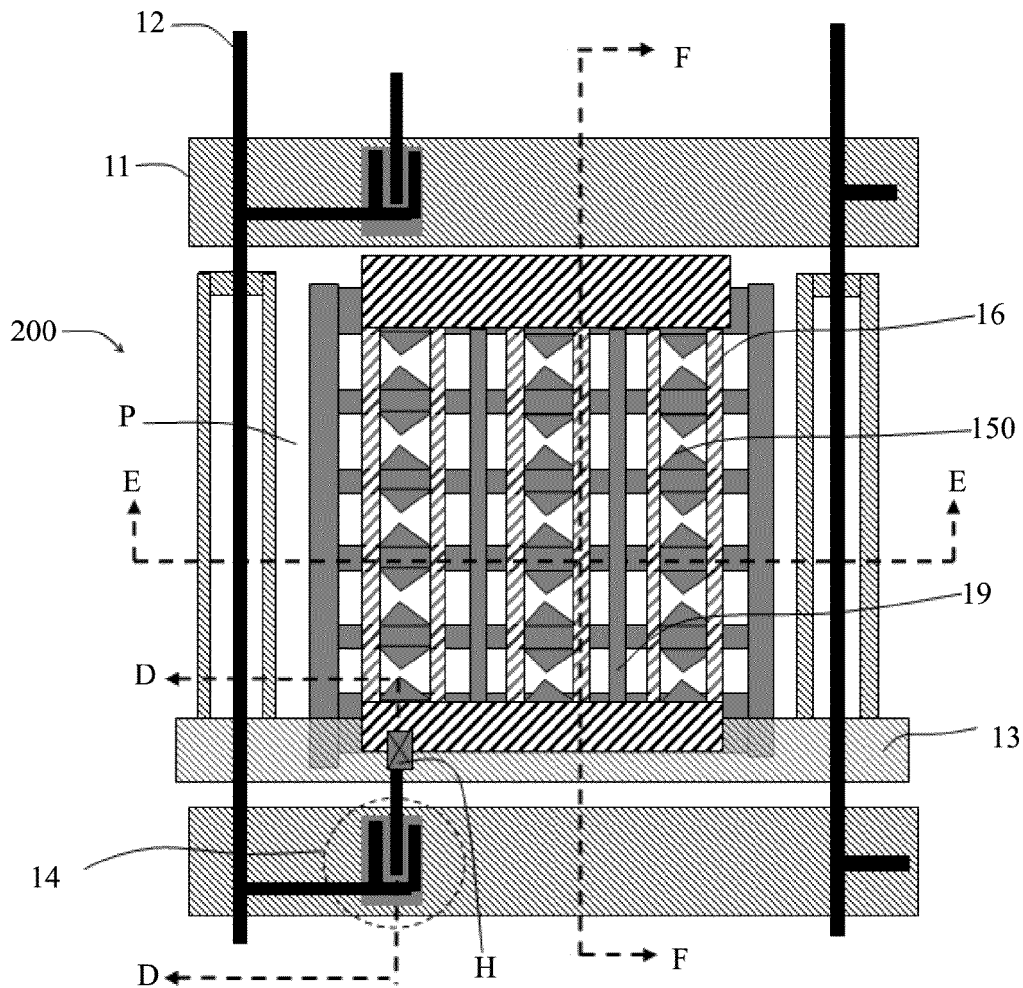
FIG. 9 is a plan view of a first substrate in an LCD device according to a second embodiment of the present invention.
Figure 10A:
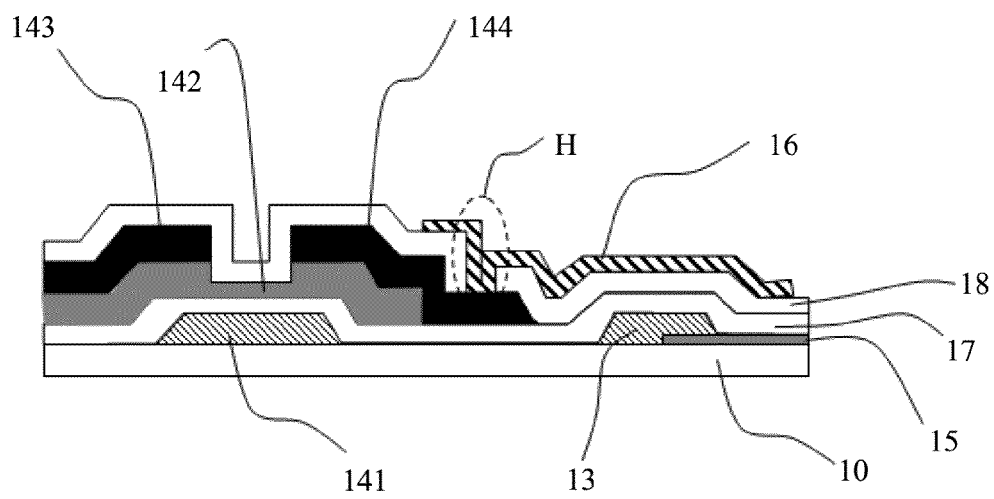
FIG. 10a is a sectional view along D-D line in FIG. 9.
Figure 10B:
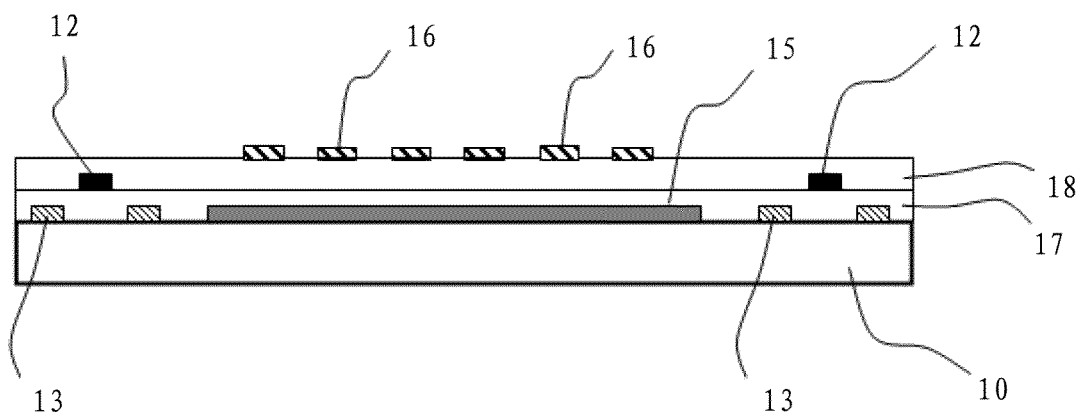
FIG. 10b is a sectional view along E-E line in FIG. 9.
Figure 10C:
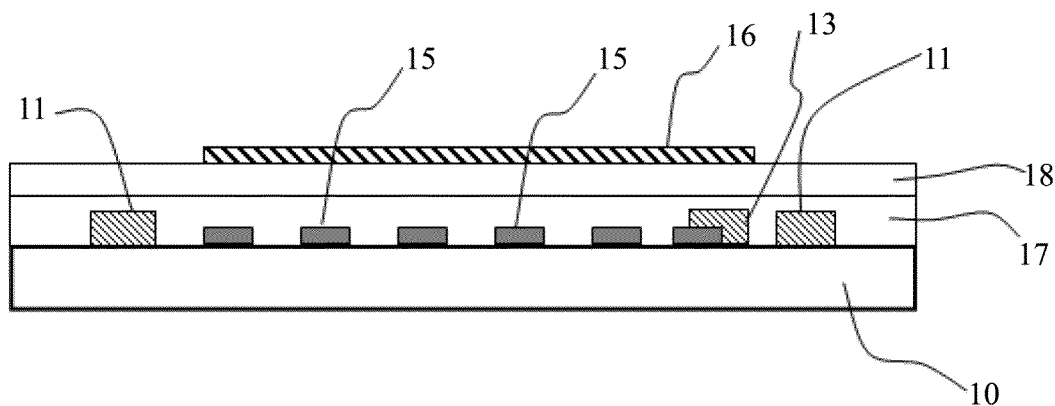
FIG. 10c is a sectional view along F-F line in FIG. 9.

FIGS. 9 and 10a-10c show the structure of a first substrate 200 in an LCD device provided by a second embodiment of the present invention. Likewise, in order to make drawings simple and clear, FIG. 9 only shows a plan view of one pixel region P in the first substrate 200. The similarity between the first substrate 200 in the LCD device provided by the second embodiment and the first substrate 100 in the LCD device provided by the first embodiment is not illustrated in detail, and the difference lies in: as shown in FIG. 9 in view of FIGS. 10a-10c, in the first substrate 200 in the second embodiment, the first electrodes 15 are common electrodes, the protrusion-shaped patterns 150 are configured on the common electrodes, and the second electrodes 16 are pixel electrodes. Further, the difference between the first substrate 200 in the second embodiment and the first substrate 100 in the first embodiment also lies in: in the first substrate 200 in the second embodiment, the common electrodes are on the lower layer and the pixel electrodes are on the upper layer, i.e., the pixel electrodes are above the common electrodes, and the insulation layer between the pixel electrodes and the common electrodes includes the gate insulation layer 17 and the passivation layer 18.

Figure 11:
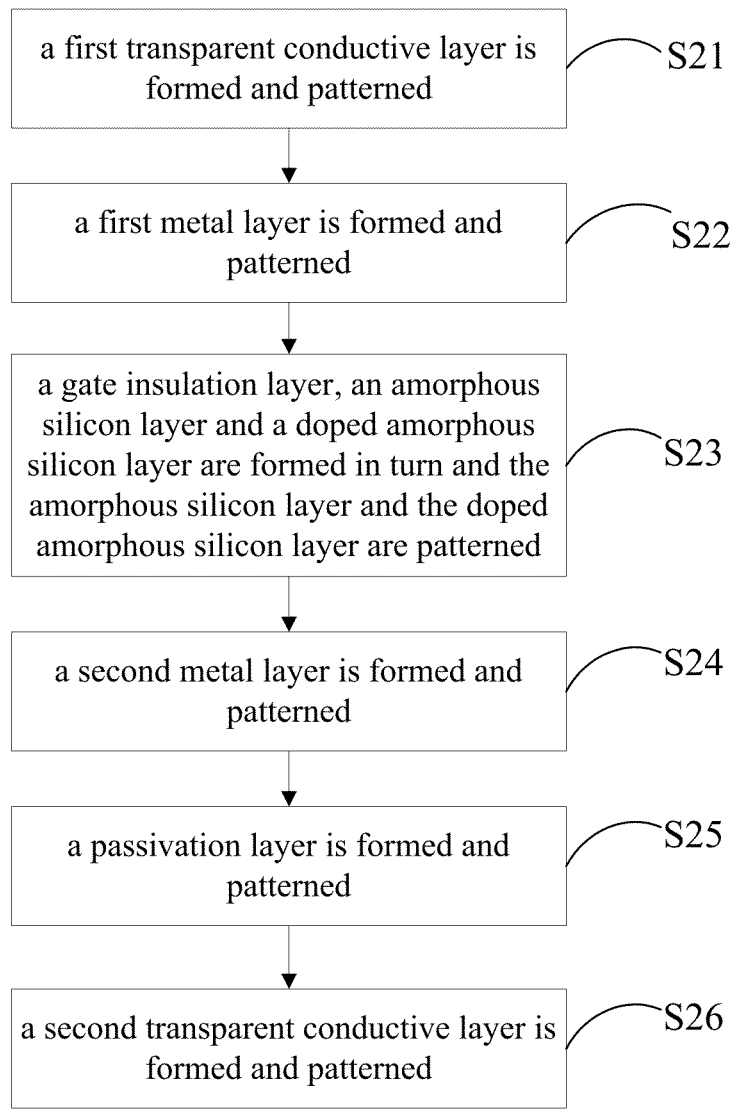
FIG. 11 is a flow diagram of manufacturing the first substrate in the LCD device of the second embodiment of the present invention shown in FIG. 9.

Similarly, the first substrate 200 in the second embodiment may be manufactured through following six mask processes, which are slightly different from the processes used for the first substrate 100 in the first embodiment. FIG. 11 shows a flow diagram of manufacturing the first substrate 200 in the second embodiment of the present invention. The manufacture process of the first substrate 200 in the second embodiment will be illustrated in detail with reference to FIG. 11 in view of FIGS. 9 and 10a-10c.

As shown in FIG. 11 in view of FIGS. 9 and 10a-10c, in block S21, a first transparent conductive layer is formed, and is patterned through a first mask process, so as to form the first electrodes 15 and the third electrodes 19 which are electrically connected to each other, and form the protrusion-shaped patterns 150 on the first electrodes 15 in a position where the first electrodes 15 do not overlap with the later formed second electrodes 16. In this embodiment, the first electrodes 15 are strip-like common electrodes 15, and the protrusion-shaped patterns 150 is located on the strip-like common electrodes 15 in a position where the strip-like common electrodes 15 do not overlap with the later formed second electrodes 16 (i.e., pixel electrodes 16).

In block S22, a first metal layer is formed, and is patterned through a second mask process, so as to form the scanning lines 11, a common electrode bus 13, the gate electrode 141 of the TFT 14, where the strip-like common electrodes 15 and the common electrode bus 13 are electrically contacted.

In block S23, a gate insulation layer 17, an amorphous silicon layer and a doped amorphous silicon layer are formed in turn, and the amorphous silicon layer and the doped amorphous silicon layer are patterned through a third mask process, so as to form a semi-conductive layer 142 of the TFT 14.

In block S24, a second metal layer is formed, and is patterned through a fourth mask process, so as to form the data lines 12, and the source electrode 143 and the drain electrode 144 of the TFT 14.

In block S25, a passivation layer 18 is formed, and is patterned through a fifth mask process, so as to form a through hole H which can make the later formed pixel electrodes 16 and the drain electrode 144 of the TFT 14 be electrically connected, and form other through holes (not shown) crossing a circuit part.

In block S26, a second transparent conductive layer is formed, and is patterned through a sixth mask process, so as to form strip-like pixel electrodes 16 which are electrically connected to each other, where the pixel electrodes 16 are electrically connected with the drain electrode 144 of the TFT 14 via the through hole H.

After performing the above blocks S21-S26, the first substrate 200 provided by the second embodiment of the present invention is formed.

Except the slight difference between the process of the first substrate in the second embodiment and the process of the first substrate in the first embodiment, the LCD device in the second embodiment and the LCD device in the first embodiment have similar advantages, which will be not illustrated in detail.

Third Embodiment

Figure 12:
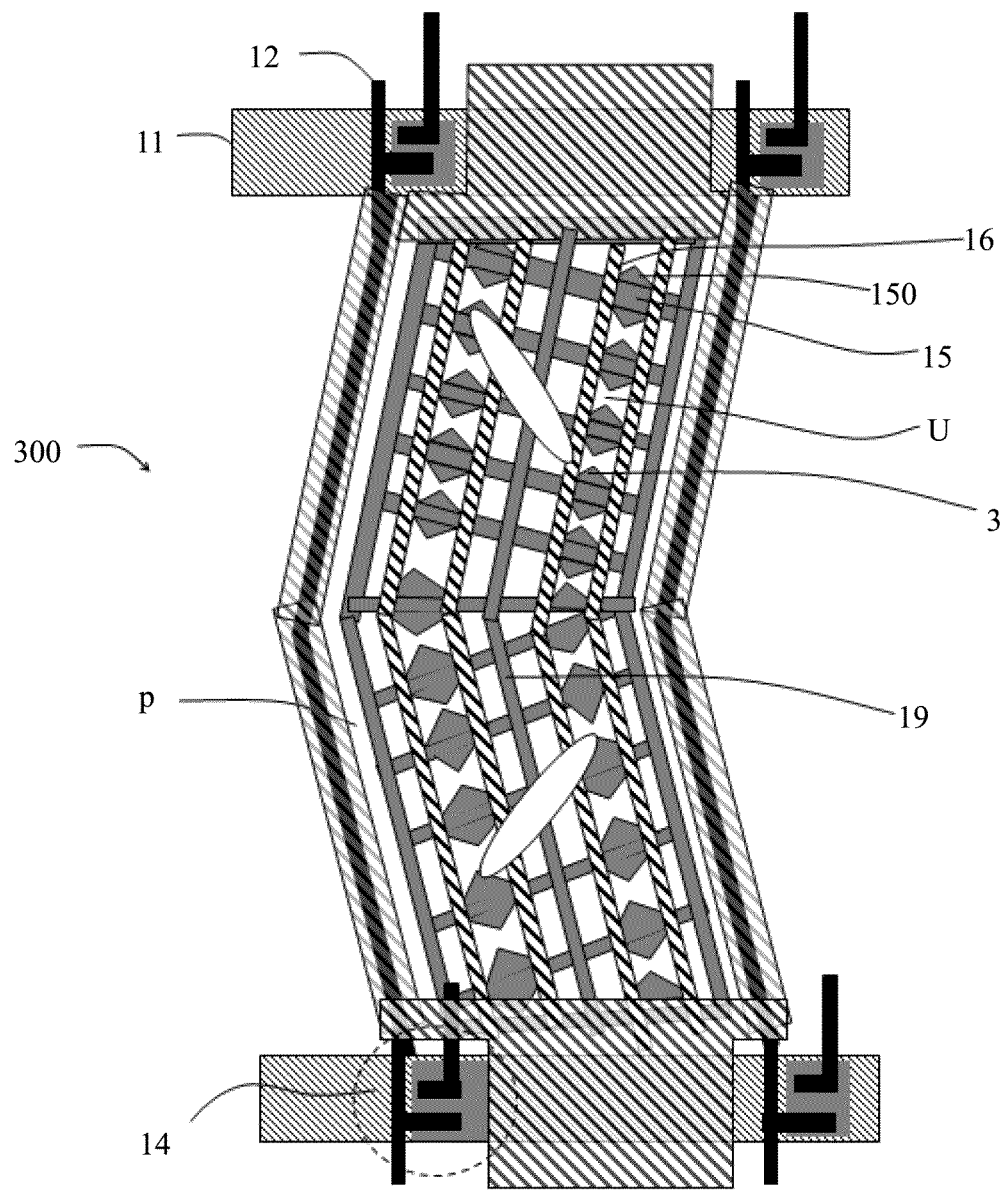
FIG. 12 is a plan view of a first substrate in an LCD device according to a third embodiment of the present invention.
Figure 13:
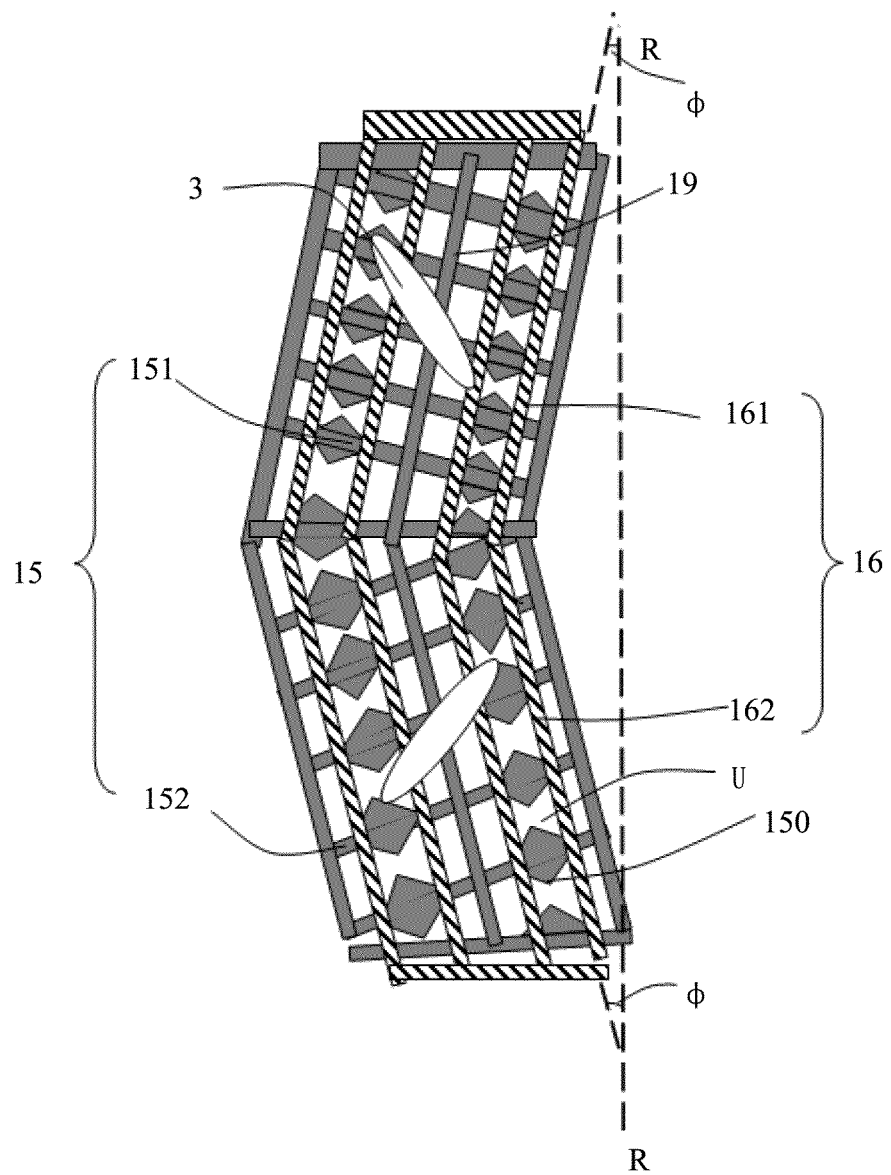
FIG. 13 is a structure diagram of first electrodes, second electrodes and third electrodes in FIG. 12.

FIGS. 12 and 13 show a structure diagram of a first substrate 300 in an LCD device in a third embodiment of the present invention. The similarity between the first substrate 300 in the LCD device provided by the third embodiment and the first substrate 100 in the LCD device provided by the first embodiment is not illustrated in detail, and the difference lies in: as shown in FIGS. 12 and 13, in the first substrate 300 in the third embodiment, the first electrodes 15, the second electrodes 16 and the third electrodes 19 are not arranged along a beeline, but have zigzag structures. Considering the zigzag structures of the first electrodes 15, the second electrodes 16 and the third electrodes 19, the data lines 12 also have the zigzag structures correspondingly. The first electrode 15 includes a first electrode part 151 arranged along a first direction and a second electrode part 152 arranged along a second direction different from the first direction. The second electrode 16 includes a third electrode part 161 intersecting with the first electrode part 151 and arranged along a third direction and a fourth electrode part 162 intersecting with the second electrode part 152 and arranged along a fourth direction, so as to divide one pixel region P into two regions. When the LCD device works, the liquid crystal molecules 3 form two different rotating regions in one pixel region P, and form two domains in one pixel region P, so as to evidently improve color shift phenomenon of the LCD device and realize a better image display effect.

In an embodiment of the present invention, the first electrode parts 151 of the plurality of first electrodes 15 are electrically connected to each other through a plurality of third electrodes 19, and the second electrode parts 152 of the plurality of first electrodes 15 are also electrically connected to each other through the plurality of third electrodes 19. The plurality of third electrodes 19 which are connected to the first electrode parts 151 of the plurality of first electrodes 15 are parallel to the third direction, and the plurality of third electrodes 19 which are connected to the second electrode parts 152 of the plurality of first electrodes 15 are parallel to the fourth direction.

In the third embodiment of the present invention, the third direction is perpendicular to the first direction, and the fourth direction is perpendicular to the second direction. That is to say, the first electrode parts 151 of the first electrodes 15 are perpendicular to the third electrode parts 161 of the second electrodes 16, and the second electrode parts 152 of the first electrodes 15 are perpendicular to the fourth electrode parts 162 of the second electrodes 16.

In the third embodiment, the first electrodes 15 are pixel electrodes, the protrusion-shaped patterns 150 are configured on the pixel electrodes, and the second electrodes 16 are common electrodes. However, the first electrodes 15 in the third embodiment are not limited to pixel electrodes, and may be common electrodes, and the protrusion-shaped patterns 150 are configured on the common electrodes, which may also realize the object of the present invention. Actually, it is possible as long as one of the first electrodes 15 and the second electrodes 16 are pixel electrodes and the other one of the first electrodes 15 and the second electrodes 16 are common electrodes.

The LCD device provided by the third embodiment of the present invention further includes a first alignment film (not shown) on the first substrate 300 and a second alignment film (not shown) on the second substrate. Since the protrusion-shaped pattern 150 is configured on the first electrode part 151 and the second electrode part 152 of the first electrode 15, in an embodiment, the rubbing direction (e.g., R-R line as shown in FIG. 13) of the first alignment film and the second alignment film is different from the directions of the third electrode part 161 and the fourth electrode part 162 of the second electrode 16 on which no protrusion-shaped pattern 150 is configured. That is to say, the rubbing direction (i.e., R-R line) of the first alignment film and the second alignment film is different from the third direction and the fourth direction, so as to make the liquid crystal molecules have an initial rotation force, form an angle between the direction of the liquid crystal molecules 3 and the electric field, and make the liquid crystal molecules 3 rotate uniformly along one direction under the action of initial electric field force. In an embodiment, an angle φ between the rubbing direction (R-R line) of the first alignment film and the second alignment film and the third and fourth directions is in the range of about 0 to about 30 degrees, so as to make the liquid crystal molecules 3 have a bigger moment of rotation along one direction initially, and have larger moment of force and faster response time. In the embodiment of the present invention, the rubbing direction (R-R line) of the first alignment film and the second alignment film is along a direction perpendicular to the scanning lines 11, and there is a predefined angle φ between the third and fourth directions each and the direction perpendicular to the scanning lines 11. Since the second electrodes 16 are configured along with the third and fourth directions, the data line 12 forming the pixel region P includes a part (not labeled) extended along the third direction and a part (not labeled) extended along the fourth direction.

The first substrate 300 in the third embodiment may be manufactured through the same six mask processes as those used for manufacturing the first substrate 100 in the first embodiment, and will not be illustrated.

Figure 14:
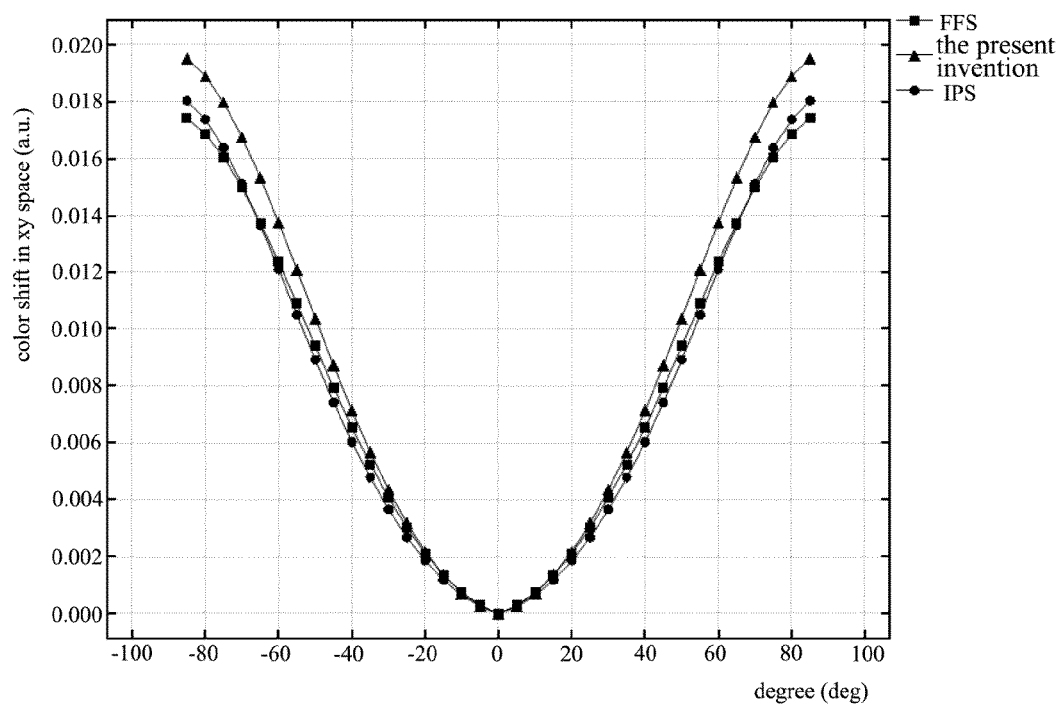
FIG. 14 is an effect contrast diagram of color shift-degree of the conventional FFS and IPS type LCD device and the LCD device provided by the third embodiment of the present invention.

The LCD device of the third embodiment can improve color shift phenomenon except having beneficial technical effects achieved by the LCD device of the first embodiment, and thus have a better image display effect. FIG. 14 shows an effect contrast diagram of color shift-degree of the conventional FFS and IPS type LCD device and the LCD device provided by the third embodiment of the present invention. As can be seen from the curve contrast in FIG. 14, the LCD device having two domains in the third embodiment of the present invention has similar color shift effect to the conventional FFS and IPS type LCD devices having two domains. Moreover, the color shift value is smaller than 0.02 when the viewing angle (i.e., an angle between the observation direction of human eyes and the normal of the LCD device) is about 60 degrees, which is regarded in the art that a better color shift effect is achieved. As can be seen from the curve contrast in FIG. 14, the color shift value of the LCD device having two domains in the third embodiment of the present invention is about 0.012 when the viewing angle is about 60 degrees, so as to better meet the requirements for the color shift in the art.

Figure 15:
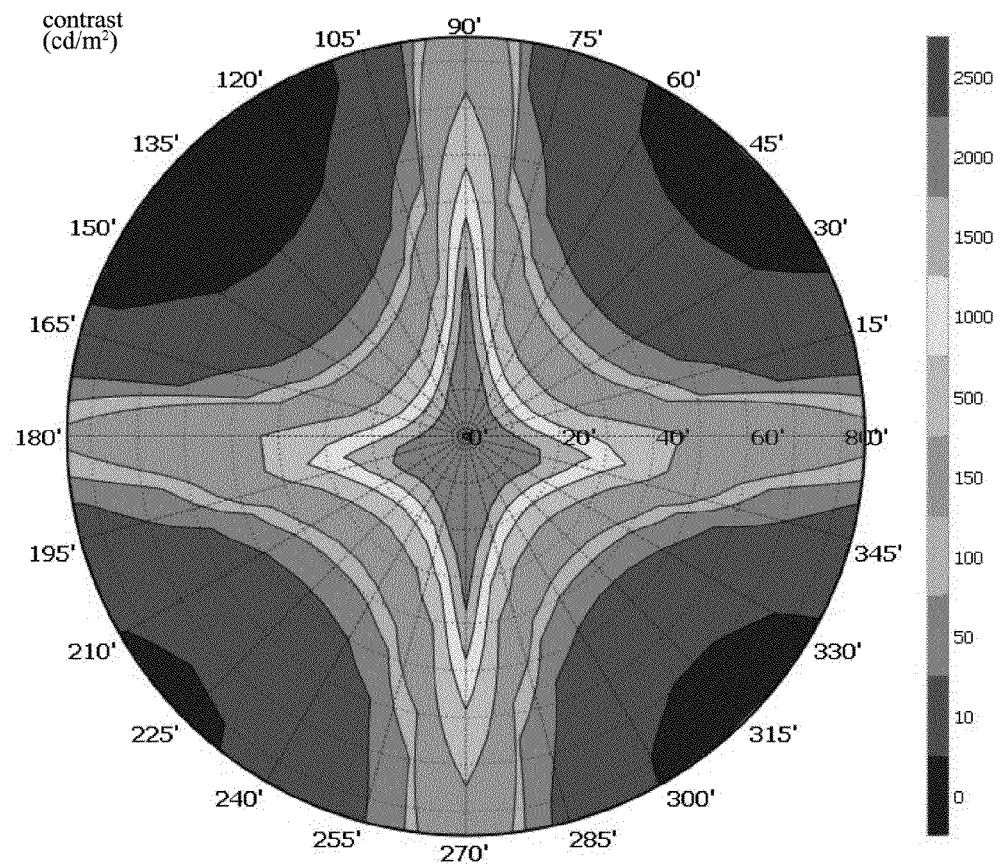
FIG. 15 is a simulation effect diagram of contrast of the LCD device provided by the third embodiment of the present invention.

FIG. 15 shows a simulation effect diagram of contrast of the LCD device provided by the third embodiment of the present invention. As can be seen from the simulation result of FIG. 15, the LCD device in the third embodiment has a high viewing angle and contrast.

The zigzag structures of the first electrodes 15, the second electrodes 16 and the third electrodes 19 on the first substrate 300 in the third embodiment are also applicable to the first substrate 200 in the second embodiment, the LCD device obtained by applying the zigzag structures of the first electrodes 15, the second electrodes 16 and the third electrodes 19 to the first substrate 200 in the second embodiment has similar beneficial technical effects to the LCD device in the third embodiment, and will not be illustrated in detail.

The principle and implementation of the LCD device of the present invention are illustrated with reference to embodiments, and the above embodiments are only used to illustrate the method and idea of the present invention. For those skilled in the art, some improvement may be made for specific implementation and application according to the idea of the present invention. To sum up, the description can not be used for limiting the present invention, and the protection scope of the present invention should be defined by the appended claims.

What is claimed is:

1. A liquid crystal display device, comprising a first substrate and a second substrate which are disposed oppositely, and a liquid crystal layer between the first substrate and the second substrate, wherein the first substrate comprises a transparent substrate, and a plurality of scanning lines and a plurality of data lines which are formed on the transparent substrate, the plurality of scanning lines and the plurality of data lines crosswise define a plurality of pixel regions; each pixel region comprises a plurality of first electrodes which are electrically connected to each other, a plurality of second electrodes which are electrically connected to each other, and a plurality of third electrodes which are electrically connected to each other; the third electrodes are arranged in parallel with the second electrodes approximately and are electrically connected with the first electrodes; the plurality of first electrodes and the plurality of second electrodes are located in different layers respectively and there is an insulation layer between the plurality of first electrodes and the plurality of second electrodes; the plurality of first electrodes and the plurality of third electrodes intersect with each other to define a plurality of unit regions; there are two second electrodes passing through inside each unit region, and the first electrode between the two second electrodes inside the unit region is provided with a protrusion-shaped pattern in a position not overlapping with the second electrode.

2. The liquid crystal display device of claim 1, wherein the plurality of first electrodes, the plurality of second electrodes and the plurality of third electrodes each have strip structures and are arranged in parallel approximately.

3. The liquid crystal display device of claim 2, wherein an angle between the first electrode and the second electrode is in the range of about 50 to about 150 degrees.

4. The liquid crystal display device of claim 3, wherein the first electrodes and the second electrodes are perpendicular to each other.

5. The liquid crystal display device of claim 4, wherein the first electrodes are arranged in parallel with one of the data line and the scanning line approximately, and the second electrodes are arranged in parallel with the other one of the data line and the scanning line approximately.

6. The liquid crystal display device of claim 2, wherein the first electrodes, the second electrodes and the third electrodes each have zigzag structures, the first electrodes comprise first electrode parts arranged along a first direction and second electrode parts arranged along a second direction different from the first direction, and the second electrodes comprise third electrode parts intersecting with the first electrode parts and arranged along a third direction and fourth electrode parts intersecting with the second electrode parts and arranged along a fourth direction.

7. The liquid crystal display device of claim 6, wherein the third direction is perpendicular to the first direction and the fourth direction is perpendicular to the second direction.

8. The liquid crystal display device of claim 6, further comprising a first alignment film located on the first substrate and a second alignment film located on the second substrate, wherein the rubbing direction of the first alignment film and the second alignment film is different from both the third direction and the fourth direction.

9. The liquid crystal display device of claim 8, wherein an angle between the rubbing direction of the first alignment film and the second alignment film and the third direction is in the range of about 0 to about 30 degrees, and an angle between the rubbing direction of the first alignment film and the second alignment film and the fourth direction is in the range of about 0 to about 30 degrees.

10. The liquid crystal display device of claim 9, wherein the rubbing direction of the first alignment film and the second alignment film is along a direction perpendicular to the scanning lines, there is a predefined angle between the third direction and the direction perpendicular to the scanning lines, there is a predefined angle between the fourth direction and the direction perpendicular to the scanning lines, the data lines forming the pixel regions comprise parts extending along the third direction and parts extending along the fourth direction.

11. The liquid crystal display device of claim 1, further comprising a first alignment film located on the first substrate and a second alignment film located on the second substrate, wherein the rubbing direction of the first alignment film and the second alignment film is different from the direction of the second electrodes.

12. The liquid crystal display device of claim 11, wherein an angle between the rubbing direction of the first alignment film and the second alignment film and the direction of the second electrodes is in the range of about 0 to about 30 degrees.

13. The liquid crystal display device of claim 1, wherein the protrusion-shaped pattern is configured in the middle of the first electrode between the two second electrodes inside the unit region.

14. The liquid crystal display device of claim 1, wherein the shape of the protrusion-shaped pattern is selected from a group consisting of triangle, trapezoid, rectangle and arc.

15. The liquid crystal display device of claim 14, wherein the shape of the protrusion-shaped pattern is triangle, and an angle between a hypotenuse of the triangle and the first electrode is in the range of about 0 to about 60 degrees.

16. The liquid crystal display device of claim 1, wherein all the protrusion-shaped patterns have the same structure.

17. The liquid crystal display device of claim 1, wherein the width of the first electrodes, the second electrodes and the third electrodes is in the range of about 2 to about 5 microns.

18. The liquid crystal display device of claim 1, wherein in the unit region, the clearance width between the two second electrodes is in the range of about 3 to about 8 microns, the clearance width between two adjacent first electrodes is in the range of about 0 to about 6 microns, the spacing between protrusion-shaped patterns on the two adjacent first electrodes is in the range of about 0 to about 6 microns, and the clearance width between the second electrode and the third electrode adjacent to the second electrode is in the range of about 2 to about 4 microns.

19. The liquid crystal display device of claim 1, wherein one of the first electrodes and the second electrodes are pixel electrodes, and the other one of the first electrodes and the second electrodes are common electrodes.

20. The liquid crystal display device of claim 19, wherein the insulation layer comprises a passivation layer and the common electrodes are located above the pixel electrodes.

21. The liquid crystal display device of claim 19, wherein the insulation layer comprises a gate insulation layer and a passivation layer, and the pixel electrodes are located above the common electrodes.

22. The liquid crystal display device of claim 1, wherein each pixel region comprises the at least four unit regions.

23. The liquid crystal display device of claim 1, wherein the first electrodes and the third electrodes are formed in the same process.

* * * * *